(12) United States Patent
Yokoi et al.

(10) Patent No.: US 11,262,023 B2
(45) Date of Patent: Mar. 1, 2022

(54) PRESSURE-RESISTANT CONTAINER

(71) Applicant: TOYODA GOSEI CO., LTD., Kiyosu (JP)

(72) Inventors: Takaaki Yokoi, Kiyosu (JP); Kosuke Kusaba, Kiyosu (JP); Shinichi Takeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 273 days.

(21) Appl. No.: 15/980,853

(22) Filed: May 16, 2018

(65) Prior Publication Data

US 2018/0356037 A1 Dec. 13, 2018

(30) Foreign Application Priority Data

Jun. 8, 2017 (JP) .............................. JP2017-113853

(51) Int. Cl.
*F17C 1/02* (2006.01)
*F17C 1/16* (2006.01)
*F17C 13/06* (2006.01)

(52) U.S. Cl.
CPC .................. *F17C 1/02* (2013.01); *F17C 1/16* (2013.01); *F17C 13/06* (2013.01);
(Continued)

(58) Field of Classification Search
CPC .... F17C 1/02; F17C 1/16; F17C 13/06; F17C 2223/036; F17C 2223/0123;
(Continued)

(56) References Cited

U.S. PATENT DOCUMENTS 3,228,549 A * 1/1966 Courtney .................. F17C 1/16
220/589
3,331,722 A * 7/1967 Ponemon .............. B29C 53/605
156/425

(Continued)

FOREIGN PATENT DOCUMENTS

JP 2005-214271 A 8/2005
JP 2010-265931 A 11/2010

*Primary Examiner* — Ernesto A Grano
(74) *Attorney, Agent, or Firm* — Posz Law Group, PLC (57) ABSTRACT

Provided is a pressure-resistant container that allows a time required for winding a fiber-reinforced member on both a tubular barrel portion and dome portions of a container body to be shortened. A pressure-resistant container includes: a container body having a tubular barrel portion, and dome portions that are provided integrally on both end portions, respectively, in an axial direction, of the tubular barrel portion; and a fiber-reinforced member that covers an outer surface of the container body. The fiber-reinforced member includes a first fiber sheet that is formed from fibers oriented in one direction, and that has a fiber direction in which the fibers extend such that the fiber direction is tilted relative to the axial direction of the container body at such an angle as to cover both the dome portions, on both sides in the axial direction, of the container body. The first fiber sheet has a sheet body portion formed in a sheet-like shape, and a plurality of protruding portions that are aligned on and protrude from both end portions, in a fiber direction, of the sheet body portion. The sheet body portion is wound along an outer surface of the tubular barrel portion to cover the tubular barrel portion. The protruding portions are wound back along outer surfaces of the dome portions to cover the dome portions.

9 Claims, 8 Drawing Sheets

(52) U.S. Cl.
CPC ............................ *F17C 2201/0109* (2013.01); *F17C 2201/054* (2013.01); *F17C 2201/056* (2013.01); *F17C 2203/011* (2013.01); *F17C 2203/0604* (2013.01); *F17C 2203/067* (2013.01); *F17C 2203/0609* (2013.01); *F17C 2203/0619* (2013.01); *F17C 2203/0624* (2013.01); *F17C 2203/0646* (2013.01); *F17C 2203/0665* (2013.01); *F17C 2205/0305* (2013.01); *F17C 2209/2154* (2013.01); *F17C 2221/012* (2013.01); *F17C 2221/033* (2013.01); *F17C 2223/0123* (2013.01); *F17C 2223/036* (2013.01); *F17C 2260/013* (2013.01); *F17C 2270/0178* (2013.01)

(58) Field of Classification Search
CPC ...... F17C 2203/0665; F17C 2209/2154; F17C 2260/013; F17C 2203/0609; F17C 2203/0624; F17C 2203/011; F17C 2201/0109; F17C 2203/0604
USPC ........................................................ 220/589
See application file for complete search history.

(56) References Cited

U.S. PATENT DOCUMENTS

| | | | | |
|---|---|---|---|---|
| 4,589,562 A * | 5/1986 | Fawley | ................... | B29C 63/24 138/104 |
| 5,385,263 A * | 1/1995 | Kirk | ................... | F17C 1/16 220/589 |
| 6,145,693 A * | 11/2000 | Berglund | ............... | B29C 53/602 220/589 |
| 6,547,092 B1 * | 4/2003 | Chervatsky | ............... | F17C 1/00 220/581 |
| 8,602,250 B2 * | 12/2013 | Berger | ...................... | F17C 1/06 220/586 |
| 8,727,174 B2 * | 5/2014 | Otsubo | ................... | F17C 13/06 156/188 |
| 9,463,281 B2 * | 10/2016 | Nagel | ................... | A61M 5/282 |
| 9,874,311 B2 * | 1/2018 | Morales | ............ | F17C 1/06 |
| 10,456,994 B2 * | 10/2019 | Nishiwaki | ............. | B29C 53/605 |
| 10,456,996 B2 * | 10/2019 | Shindo | ................... | B29C 70/86 |
| 10,507,999 B2 * | 12/2019 | Kato | ...................... | B29C 35/16 |
| 2005/0087536 A1 * | 4/2005 | Caudill | .................... | F17C 1/16 220/586 |
| 2006/0065664 A1 * | 3/2006 | Ohta | ...................... | B29C 53/602 220/588 |
| 2006/0096993 A1 * | 5/2006 | Takashima | ........ | H01M 8/04201 220/588 |
| 2006/0099366 A1 * | 5/2006 | Takemoto | ............... | B29C 70/44 428/36.1 |
| 2006/0163261 A1 * | 7/2006 | Sugiura | ..................... | F17C 1/16 220/581 |
| 2007/0205201 A1 * | 9/2007 | Cundiff | .................... | F17C 1/06 220/591 |
| 2009/0308874 A1 * | 12/2009 | Lindner | .................... | F17C 1/16 220/560.05 |
| 2010/0276434 A1 * | 11/2010 | Berger | ...................... | F17C 1/06 220/586 |
| 2011/0139796 A1 * | 6/2011 | Lukiyanets | ............... | F17C 1/06 220/581 |
| 2011/0168726 A1 * | 7/2011 | Silva Vieira | .......... | F17C 13/084 220/590 |
| 2012/0021165 A1 * | 1/2012 | Hethcock | ................ | B32B 27/12 428/107 |
| 2014/0008373 A1 * | 1/2014 | Sharp | ..................... | F17C 1/06 220/586 |
| 2015/0240993 A1 * | 8/2015 | DeLay | ...................... | F17C 1/16 220/590 |
| 2016/0354970 A1 * | 12/2016 | Taki | ...................... | B29C 53/602 |
| 2017/0328518 A1 * | 11/2017 | Pegel | ...................... | B29C 53/56 |
| 2018/0104916 A1 * | 4/2018 | Nishiwaki | ................ | F17C 1/16 |
| 2018/0257321 A1 * | 9/2018 | Maekawa | ................ | F17C 1/02 |
| 2018/0290537 A1 * | 10/2018 | Ueda | .................... | B29C 53/822 |
| 2018/0292047 A1 * | 10/2018 | Lanzl | ........................ | F17C 1/06 |
| 2019/0242525 A1 * | 8/2019 | Criel | ....................... | B29C 65/02 |
| 2019/0277447 A1 * | 9/2019 | Rocher | ..................... | F17C 1/16 |

* cited by examiner

PRESSURE-RESISTANT CONTAINER

TECHNICAL FIELD

The present invention relates to a pressure-resistant container.

BACKGROUND ART

To date, a pressure-resistant container that has a container body reinforced by a fiber-reinforced member being wound on the outer surface of the container body, has been known (for example, JP2005-214271 (A) and JP2010-265931 (A)). Examples of the fiber-reinforced member of the pressure-resistant container include fiber-reinforced members formed by high strength fibers such as carbon fibers and glass fibers being wound by a filament winding method, and also include fiber-reinforced members having hoop layers, helical layers, and in-plane layers that are layered in the radial direction of the container body. The hoop layer is a layer in which the fiber extends almost perpendicular to the axial direction of the container body, and the hoop layer is formed on the outer surface side of a tubular barrel portion of the container body. The helical layer is a layer in which the fiber helically extends so as to be tilted relative to the axial direction of the container body, and the helical layer is formed on the outer surface sides of both the tubular barrel portion of the container body, and dome portions, of the container body, provided on both sides in the axial direction. The in-plane layer is a layer in which the fiber extends so as to be tilted at a small angle relative to the axial direction of the container body, and the in-plane layer is formed on the outer surface sides of both the tubular barrel portion of the container body and the dome portions, of the container body, provided on both sides in the axial direction.

In the pressure-resistant container disclosed in JP2005-214271 (A), the fiber-reinforced member has a first sheet (hoop layer) formed such that the fiber direction is orthogonal to the axial direction of the container body, and a second sheet (in-plane layer) formed such that the fiber direction is tilted at a small angle relative to the axial direction of the container body. The first sheet and the second sheet are each formed in a sheet-like shape so as to be layered over each other and to cover the tubular barrel portion of the container body. In a case where the fiber-reinforced member is wound on the outer surface of the tubular barrel portion of the container body, when the fiber-reinforced member is formed in a sheet-like shape, the tubular barrel portion is merely covered by the one sheet member, and one fiber (including a fiber bundle formed by bundling a plurality of fibers) need not be wound on the outer surface of the container body while the one fiber is being rotated relative to the container body. Therefore, the sheet structure of the fiber-reinforced member as described above allows a time required for winding the fiber-reinforced member on the tubular barrel portion of the container body to be shortened.

Furthermore, in the pressure-resistant container disclosed in JP2010-265931 (A), the fiber-reinforced member has a fiber sheet that forms a hoop layer. The fiber sheet is wound on the tubular barrel portion of the container body, and covers the tubular barrel portion. Therefore, as compared to a structure in which one fiber is wound on the outer surface of the container body, a time required for winding the fiber-reinforced member on the tubular barrel portion of the container body is shortened.

SUMMARY OF INVENTION

Technical Problem

In order to form the helical layer, the fiber-reinforced member needs to be wound not only on the tubular barrel portion of the container body, but also on the dome portions integrated with both end portions, respectively, in the axial direction, of the tubular barrel portion. In the pressure-resistant container disclosed in JP2010-265931 (A), the helical layer of the fiber-reinforced member is formed by one fiber being wound on the container body. In a case where one fiber is wound on both the tubular barrel portion and the dome portions in order to form the helical layer, each winding needs to be carefully performed so as to prevent each fiber from slipping on the surfaces of the dome portions, and a time required for the winding is increased.

The present invention is made in view of the above-described problem, and an object of the present invention is to provide a pressure-resistant container formed by shortening a time required for winding a fiber-reinforced member on both a tubular barrel portion and dome portions of a container body.

Solution to Problem

The present invention is directed to a pressure-resistant container that includes: a container body having a tubular barrel portion, and dome portions that are provided integrally on both end portions, respectively, in an axial direction, of the tubular barrel portion; and a fiber-reinforced member that covers an outer surface of the container body. The fiber-reinforced member includes a first fiber sheet that is formed from fibers oriented in one direction, and that has a fiber direction in which the fibers extend such that the fiber direction is tilted relative to the axial direction of the container body at such an angle as to cover both the dome portions, on both sides in the axial direction, of the container body. The first fiber sheet has a sheet body portion formed in a sheet-like shape, and a plurality of protruding portions that are aligned on and protrude from both end portions, in a fiber direction, of the sheet body portion. The sheet body portion is wound into a tubular shape along an outer surface of the tubular barrel portion to cover the tubular barrel portion. The protruding portions are wound back along outer surfaces of the dome portions to cover the dome portions.

In this configuration, the first fiber sheet of the fiber-reinforced member is formed from fibers oriented in one direction, and the fiber direction in which the fibers extend is tilted relative to the axial direction of the container body at such an angle as to cover both the dome portions on both sides in the axial direction. In the first fiber sheet, the sheet body portion formed in a sheet-like shape is wound into a tubular shape along the outer surface of the tubular barrel portion, to cover the tubular barrel portion of the container body, and a plurality of the protruding portions that are aligned on and protrude from both end portions, in the fiber direction, of the sheet body portion are wound back along the outer surfaces of the dome portions, to cover the dome portions. In such a structure, the sheet body portion formed in the sheet-like shape is used in order to form a layer that covers the tubular barrel portion. Therefore, a time required for forming a layer on the tubular barrel portion is greatly shortened. A plurality of protruding portions that are aligned on and protrude from both end portions, in the fiber direction, of the sheet body portion are used in order to forma layer that covers the dome portions. Therefore, the plurality of protruding portions that cover the dome portions are integrated with the sheet body portion, and the protruding portions are inhibited from being individually separated, so that the protruding portions are easily wound on the dome portions, and a time required for forming a layer on the dome portion is shortened. Therefore, a time required for winding the fiber-reinforced member on both the tubular barrel portion and the dome portions of the container body is shortened.

DESCRIPTION OF EMBODIMENTS

Hereinafter, an embodiment of a pressure-resistant container according to the present invention is specifically described with reference to the drawings.

First Embodiment

Figure 1:
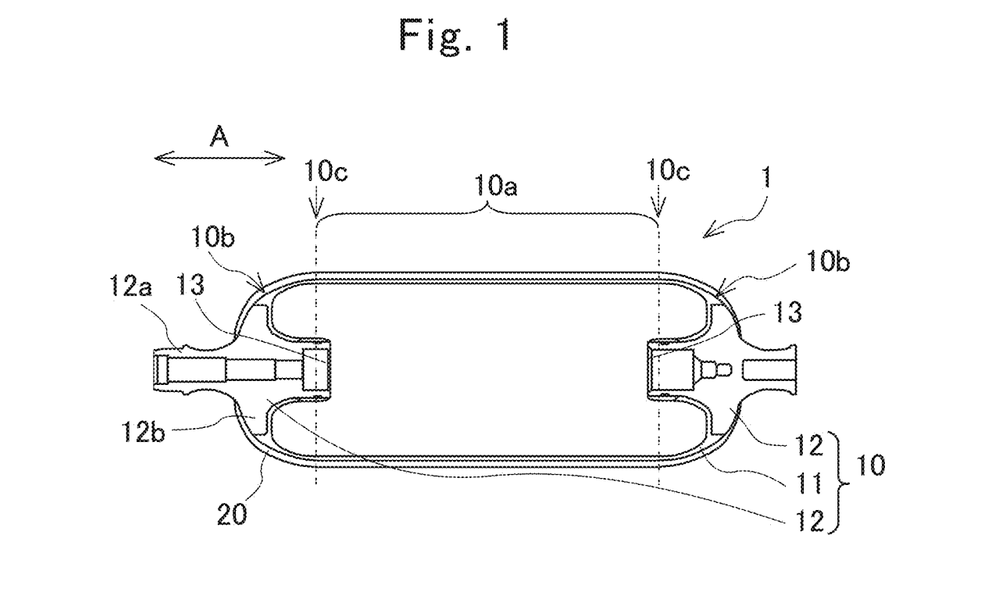
FIG. 1 schematically illustrates a structure of a pressure-resistant container according to a first embodiment of the present invention.

A pressure-resistant container 1 according to a first embodiment is described with reference to FIG. 1 to FIG. 6. The pressure-resistant container 1 is, for example, a tank that is filled with hydrogen gas, natural gas, or the like at high pressure. The pressure-resistant container 1 is mounted to, for example, an automobile. The pressure-resistant container 1 includes a container body 10 and a fiber-reinforced member 20 as shown in FIG. 1.

The container body 10 is a hollow liner that forms an inner wall layer of the pressure-resistant container 1. The container body 10 has a tubular barrel portion 10a and dome portions 10b. The tubular barrel portion 10a is formed in a tubular shape (specifically, a cylindrical shape). The tubular barrel portion 10a has an almost uniform outer diameter. Each dome portion 10b is formed in a semi-spherical shape.

The dome portions 10b are provided at both axially ends portions, respectively, of the tubular barrel portion 10a so as to be integrated with the tubular barrel portion 10a. That is, the container body 10 is formed such that the tubular barrel portion 10a and the two dome portions 10b are integrated with each other. The internal space of the container body 10 is filled with gas. Hereinafter, a direction in which the axes of the pressure-resistant container 1 and the container body 10 extend is referred to as axial direction A as appropriate.

The container body 10 includes a liner portion 11 and caps 12 as components. That is, the container body 10 is structured by the liner portion 11 and the caps 12 being assembled. The liner portion 11 and the caps 12 form the tubular barrel portion 10a and the dome portions 10b in a state where the liner portion 11 and the caps 12 are assembled.

The liner portion 11 is formed in such a shape (that is, almost cylindrical shape) as to form at least the tubular barrel portion 10a. The liner portion 11 may be formed so as to include at least a part of the dome portions 10b. The liner portion 11 is formed from a material having gas barrier properties (for example, polyethylene resin, polypropylene resin, or another hard resin). The liner portion 11 may be, for example, a metal liner formed from a material such as aluminium.

Openings 13 are formed in both axially end portions, respectively, of the liner portion 11. Each opening 13 is formed substantially in such a round shape that the apex of the dome portion 10b having the semi-spherical shape is the center of the round shape. The cap 12 is inserted in the opening 13. The caps 12 are fixed at both axially end portions, respectively, of the liner portion 11. The cap 12 is fixed to the liner portion 11 by the cap 12 and the liner portion 11 being screwed into each other, or insert molding. The cap 12 is formed in an almost cylindrical shape, and includes a boss portion 12a and a flange portion 12b. The end portion of the boss portion 12a of the cap 12 protrudes outward in the axial direction A from the apex of the dome portion 10b. The cap 12 is, for example, formed from a metal such as aluminium or an aluminium alloy. A valve (not shown) is mounted to the cap 12 by screwing.

The fiber-reinforced member 20 is a reinforcing member that forms an outer wall layer of the pressure-resistant container 1, and covers the outer surface of the container body 10. The fiber-reinforced member 20 is formed from a high strength fiber impregnated with resin. Examples of the high strength fiber include carbon fibers, glass fibers, and aramid fibers. Furthermore, the resin with which the high strength fiber is impregnated is a thermosetting resin such as epoxy resin, unsaturated polyester resin, or vinyl ester resin. The resin may be a thermoplastic resin such as polyester resin or polyethylene resin. The fiber-reinforced member 20 is fixedly adhered onto the outer surface side of the container body 10 by the resin impregnated in the high strength fiber being hardened in a state where the fiber-reinforced member 20 covers the outer surface of the container body 10.

The fiber-reinforced member 20 has an entire structure in which a hoop layer and a helical layer are layered in the radial direction such that the hoop layer and the helical layer are alternately layered so as to form a plurality of layers. The hoop layer is a layer in which a fiber extends almost perpendicular to the axial direction A of the container body 10. The hoop layer is formed on the outer surface side of the tubular barrel portion 10a of the container body 10 so as to be wound and tightened onto the tubular barrel portion 10a. Meanwhile, the helical layer is a layer in which a fiber helically extends so as to be tilted relative to the axial direction A of the container body 10. The helical layer is a small-angle helical layer in which the fiber is tilted relative to the axial direction A of the container body 10 at a relatively small angle. The helical layer is formed on the outer surface sides of both the tubular barrel portion 10a and the dome portions 10b of the container body 10 so as to be wound and tightened onto the dome portions 10b.

Figure 2:
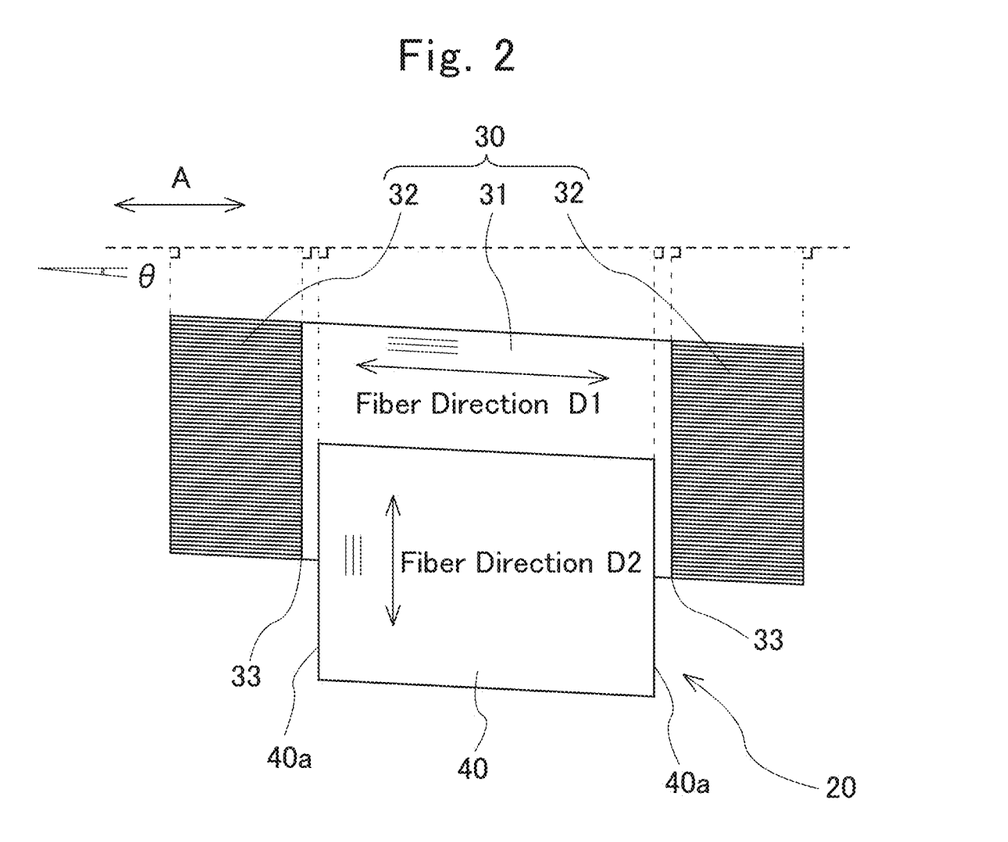
FIG. 2 is a plan view of a fiber-reinforced member of the pressure-resistant container according to the first embodiment.

The fiber-reinforced member 20 includes a first fiber sheet 30 and a second fiber sheet 40 as shown in FIG. 2. The first fiber sheet 30 and the second fiber sheet 40 are each formed from fibers oriented in one direction. In this specification, the fiber represents not only one fiber but also a fiber bundle formed by a plurality of fibers being bundled. The first fiber sheet 30 is a sheet member that forms the small angle helical layer described above. The second fiber sheet 40 is a sheet member that forms the hoop layer described above. The tensile strength, in the fiber direction, of the fiber of the first fiber sheet 30 is less than the tensile strength, in the fiber direction, of the fiber of the second fiber sheet 40. For example, the tensile strength of the fiber of the first fiber sheet 30 is about 3.5 GPa, and the tensile strength of the fiber of the second fiber sheet 40 is about 6.5 GPa.

The fiber direction, in which the fiber of the first fiber sheet 30 extends, is tilted relative to the axial direction A of the container body 10 at an angle θ so as to cover both the dome portions 10b on both sides, in the axial direction, of the container body 10 when the first fiber sheet 30 covers the container body 10. The first fiber sheet 30 includes a sheet body portion 31 and protruding portions 32.

The sheet body portion 31 is formed in a sheet-like shape. The sheet body portion 31 is structured such that a plurality of fibers oriented in one direction are aligned in parallel and fixed or fixedly adhered to each other. The sheet body portion 31 is formed into the sheet-like shape in advance before the sheet body portion 31 is wound on the outer surface of the container body 10. The sheet body portion 31 is wound into a tubular shape (specifically, cylindrical shape) along the outer surface of the tubular barrel portion 10a of the container body 10, thereby covering the tubular barrel portion 10a. The length, in the axial direction, of the sheet body portion 31 is almost equal to the length, in the axial direction, of the tubular barrel portion 10a of the container body 10.

The sheet body portion 31 is formed and disposed such that the fiber direction of the sheet body portion 31 is a direction D1 that forms the angle θ between the direction D1 and the axial direction A of the container body 10 when the sheet body portion 31 covers the tubular barrel portion 10a. That is, the sheet body portion 31 covers the tubular barrel portion 10a in a state where the fiber extends in the direction D1 that forms the angle θ between the direction D1 and the axial direction A of the container body 10. Hereinafter, the direction D1 is referred to as fiber direction D1. The angle θ is set to have a value that meets the outer shape (specifically, for example, the length, in the axial direction, of the tubular barrel portion 10a and the outer diameter of the tubular barrel portion 10a, and the outer diameter of the dome portion 10b) of the container body 10, and is set as an angle ranging from, for example, 1° to 30°. Furthermore, the sheet body portion 31 may be formed such that a plurality of fibers having the same fiber length are aligned in parallel with each other, and the winding start end side in the circumferential direction is disposed in the circumferential direction so as to be tilted relative to the axial direction A, or such that a plurality of fibers having gradually increasing fiber lengths, respectively, are aligned in parallel with each other, and the winding start end side in the circumferential direction is parallel to the axial direction A.

The protruding portions 32 are integrated with the sheet body portion 31. The protruding portion 32 is formed as a strip-like member, a blind-like member, or a fiber-like member. The protruding portions 32 are provided on the outer sides (end portions), in the fiber direction D1, of the sheet body portion 31. The protruding portions 32 protrude from each of both the end portions, in the fiber direction D1, of the sheet body portion 31. A plurality of the protruding portions 32 are provided at each of both the end portions of the sheet body portion 31. The width, of each protruding portion 32, in the direction orthogonal to the protruding direction is set so as to be less than or equal to 10% of the tank diameter of the container body 10. The protruding portions 32 are structured such that a plurality of fibers oriented in one direction are aligned in parallel with each other, and fixed or fixedly adhered to each other.

The protruding portions 32 are disposed such that a plurality of the protruding portions 32 are aligned in parallel with each other and protrude at both end portions, in the fiber direction D1, of the sheet body portion 31. The protruding portions 32 adjacent to each other are disposed without a gap in the direction in which the protruding portions 32 are adjacent to each other. The protruding portions 32 and the sheet body portion 31 are formed from the same fiber, and the fiber of each protruding portion 32 and the fiber of the sheet body portion 31 are continuous with each other. The protruding portion 32 is formed into a desired shape (such as strip-like shape) in advance before the protruding portion 32 is wound on the outer surface of the container body 10.

The first fiber sheet 30 is formed from one sheet member that forms the sheet body portion 31 and the protruding portions 32. The sheet member is formed so as to have the length, in the fiber direction, obtained when the sheet body portion 31 and the two protruding portions 32 are connected in series in the fiber direction. The first fiber sheet 30 is preferably structured such that, for example, both end portions, in the fiber direction D1, of the sheet member are each cut in parallel with and along the fiber direction D1 by a length corresponding to each protruding portion 32, and the sheet body portion 31 and the protruding portions 32 are thus integrated with each other.

The protruding portion 32 has a length in the protruding direction such that the protruding portion 32 extends from a portion near a boundary (hereinafter, referred to as a container boundary) 10c between the dome portion 10b and the tubular barrel portion 10a of the container body 10 through a surface including a portion near the apex (that is, the end portion of the boss portion 12a of the cap 12) of the dome portion 10b to a portion near the container boundary 10c on the radially opposite side. The protruding portion 32 is wound back from the sheet body portion 31 side along the outer surface of the dome portion 10b, thereby covering the dome portion 10b.

Figure 3:
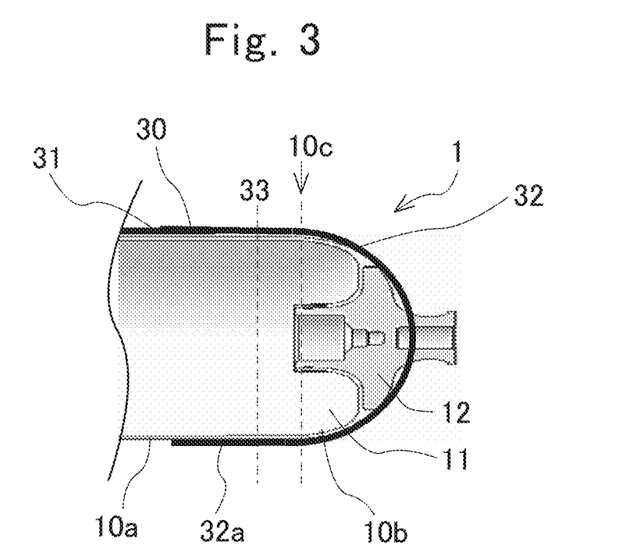
FIG. 3 schematically illustrates a structure of a first fiber sheet of the fiber-reinforced member being wound back on a container body in the pressure-resistant container according to the first embodiment.

Each protruding portion 32 is wound back along the outer surface of the dome portion 10b such that a gap between the protruding portion 32 and the surface of the dome portion 10b is almost non-existent, that is, the protruding portions 32 are not crimped. A plurality of the protruding portions 32 extending from a portion near the container boundary 10c over the entire circumference of the tubular barrel portion 10a are each wound back so that the protruding portions 32 are layered outward and woven into each other while being displaced, thereby covering the entirety of the dome portion 10b.

The length, in the axial direction, of the sheet body portion 31 is almost equal to the length, in the axial direction, of the tubular barrel portion 10a of the container body 10 as described above. Specifically, the length, in the axial direction, of the sheet body portion 31 is slightly less than the length, in the axial direction, of the tubular barrel portion 10a. The sheet body portion 31 covers a region, of the tubular barrel portion 10a, except for a part of each of both side portions in the axial direction A. That is, the tubular barrel portion 10a is covered by the sheet body portion 31 such that a part of each of both the side portions, in the axial direction A, of the tubular barrel portion 10a is not covered. A boundary (hereinafter, referred to as sheet boundary) 33 between the sheet body portion 31 and the protruding portion 32 of the first fiber sheet 30 is located at a position (that is, position that is closer to the center in the axial direction than the container boundary 10c is) opposing the tubular barrel portion 10a in the radial direction, and is located outward of the tubular barrel portion 10a in the radial direction. The sheet boundaries 33 between the sheet body portion 31 and the plurality of the protruding portions 32, respectively, which are aligned in parallel with each other and protrude, are linearly aligned over the entire circumference of the tubular barrel portion 10a when the sheet body portion 31 covers the tubular barrel portion 10a.

Figure 4:
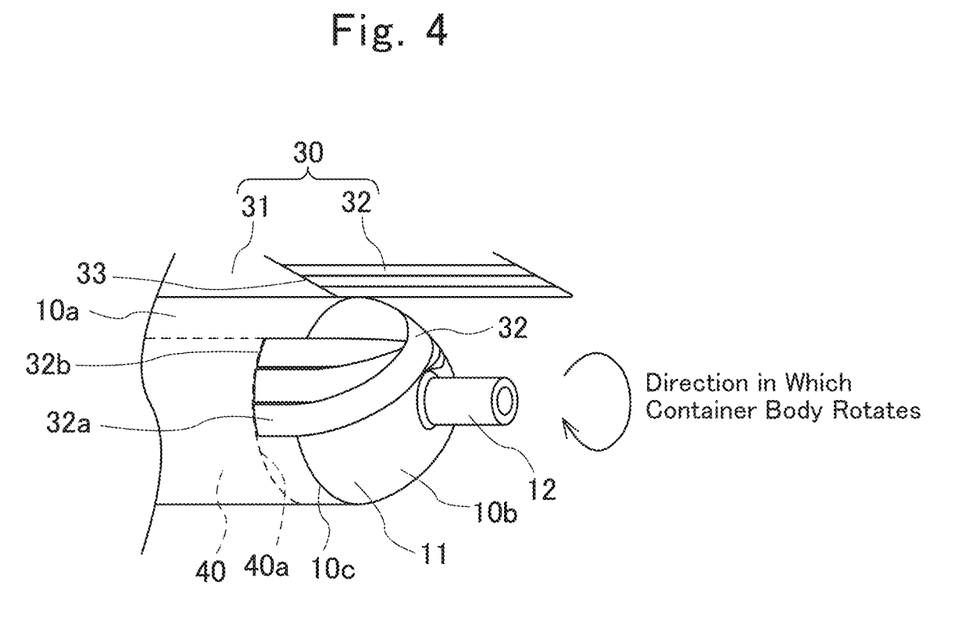
FIG. 4 illustrates a technique of winding the first fiber sheet back on the container body in the pressure-resistant container according to the first embodiment.

The protruding portion 32 is formed such that, in a state where the dome portion 10b is covered, an end portion 32a, in the protruding direction, of the protruding portion 32 is closer to the center in the axial direction of the container body 10 than the sheet boundary 33 is, as shown in FIG. 3 and FIG. 4. That is, the end portion 32a of the protruding portion 32 that covers the dome portion 10b opposes the sheet body portion 31 in the radial direction, that is, opposes the tubular barrel portion 10a in the radial direction. While the protruding portion 32 covers the dome portion 10b, the protruding portion 32 is wound back to the tubular barrel portion 10a on the container body 10. In this case, the end portion 32a of the protruding portion 32 is sandwiched between the tubular barrel portion 10a and the sheet body portion 31 outside the tubular barrel portion 10a in the radial direction.

Figure 5:
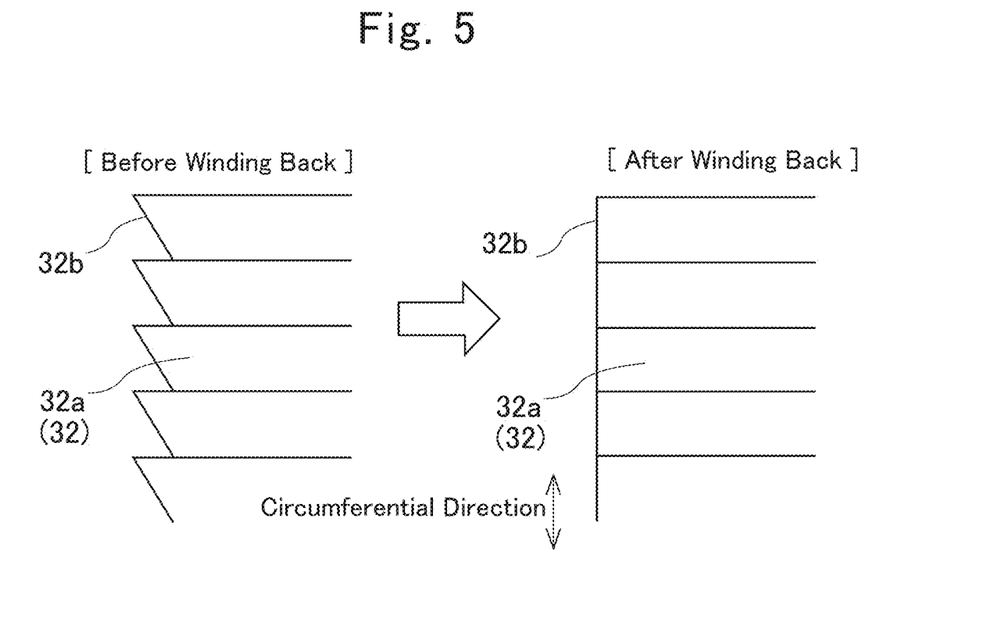
FIG. 5 illustrates states before and after the first fiber sheet is wound back on the container body in the pressure-resistant container according to the first embodiment.

The end portion 32a of each protruding portion 32 is formed such that, in a state where the plurality of the protruding portions 32, aligned in parallel with each other and protruding at both end portions, in the fiber direction D1, of the sheet body portion 31, are wound back along the outer surfaces of the dome portions 10b, and cover the dome portions 10b, sides 32b at the ends of the end portions 32a extend along the circumferential direction of the tubular barrel portion 10a of the container body 10, and the sides 32b of the plurality of the end portions 32a are aligned linearly in the circumferential direction to form a straight line, as shown on the right side in FIG. 5. The end portion 32a of each protruding portion 32 is formed such that, before the plurality of the protruding portions 32, which are aligned in parallel with each other and protrude at both end portions, in the fiber direction D1, of the sheet body portion 31, are wound back along the outer surfaces of the dome portions 10b, the sides 32b of the end portion 32a are not linearly aligned in the circumferential direction and are formed in, for example, a triangular wave or a sawteeth-shape, as shown on the left side in FIG. 5. The end portions 32a are formed in order to absorb displacement generated by the protruding portions 32 being wound back around the semi-spherical dome portions 10b such that the ends of the end portions 32a and an end 40a, in the axial direction, of the second fiber sheet 40 oppose each other at an engagement position C described below without a gap.

The second fiber sheet 40 is formed in a sheet-like shape. The second fiber sheet 40 is structured such that a plurality of fibers oriented in one direction are aligned in parallel with each other. The second fiber sheet 40 is formed into the sheet-like shape in advance before the second fiber sheet 40 is wound on the outer surface of the container body 10. The second fiber sheet 40 is wound into a tubular shape (specifically, cylindrical shape) on the outer surface of the tubular barrel portion 10a of the container body 10, thereby covering the tubular barrel portion 10a. The length, in the axial direction, of the second fiber sheet 40 is almost equal to the length, in the axial direction, of the tubular barrel portion 10a of the container body 10.

The second fiber sheet 40 is formed and disposed such that the fiber direction of the second fiber sheet 40 is a direction D2 (that is, circumferential direction) that is orthogonal to the axial direction A of the container body 10 when the second fiber sheet 40 covers the tubular barrel portion 10a. That is, the second fiber sheet 40 covers the tubular barrel portion 10a in a state where the fiber of the second fiber sheet 40 extends in the circumferential direction of the tubular barrel portion 10a. The second fiber sheet 40 is layered over the sheet body portion 31 of the first fiber sheet 30 in the radial direction. The sheet body portion 31 of the first fiber sheet 30, and the second fiber sheet 40 are alternately layered in the radial direction.

The length, in the axial direction, of the second fiber sheet 40 is almost equal to the length, in the axial direction, of the tubular barrel portion 10a of the container body 10 as described above. Specifically, the length, in the axial direction, of the second fiber sheet 40 is less than the length, in the axial direction, of the tubular barrel portion 10a. As described above, in a state where the protruding portions 32 cover the dome portions 10b, the end portion 32a of the protruding portion 32 of the first fiber sheet 30 is closer to the center, in the axial direction, of the container body 10 than the sheet boundary 33 is, and opposes the tubular barrel portion 10a in the radial direction. The second fiber sheet 40 is formed and disposed so as not to overlap the end portion 32a of the protruding portion 32 of the first fiber sheet 30 in the radial direction.

Figure 6:
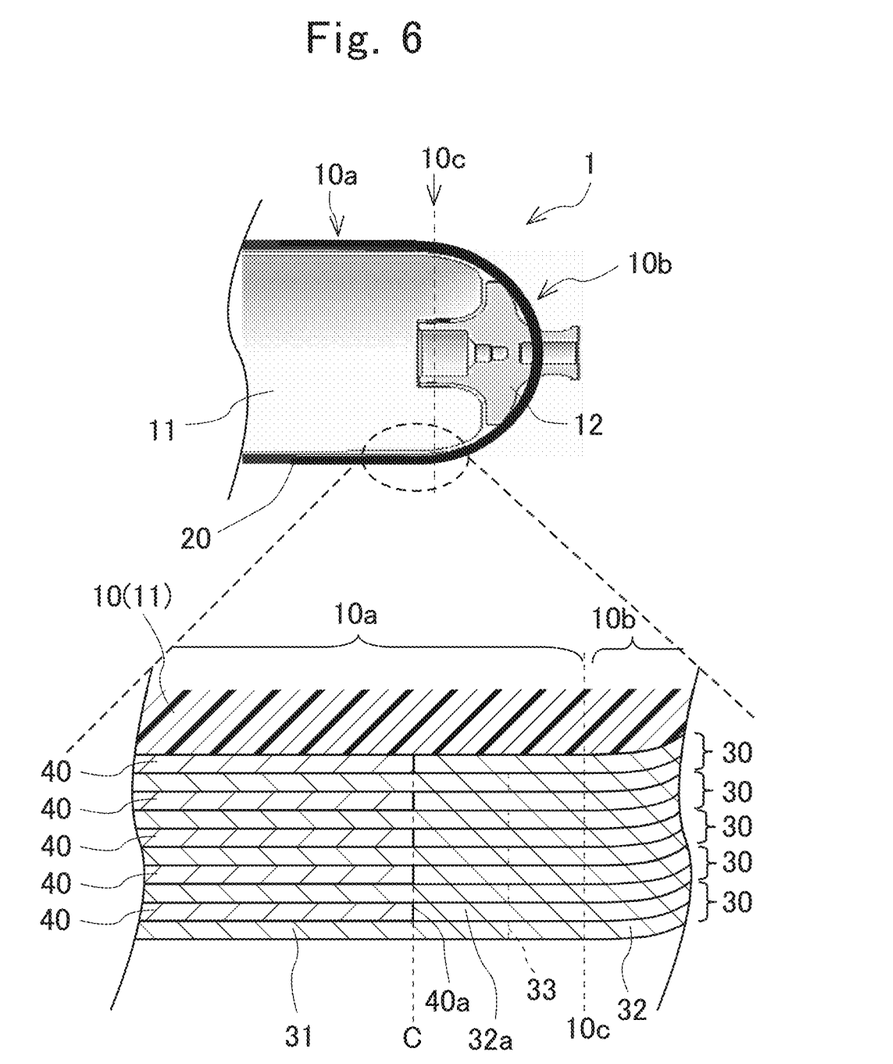
FIG. 6 illustrates an enlarged cross-section of a main portion of the pressure-resistant container according to the first embodiment.

That is, the second fiber sheet 40 has a length, in the axial direction, corresponding to a distance over which the ends of the end portions 32a of the protruding portions 32 on both sides, in the fiber direction D1, of the first fiber sheet 30 are distant from each other in the axial direction A when the protruding portions 32 on both sides, in the fiber direction D1, of the first fiber sheet 30 cover the dome portions 10b on both the sides in the axial direction. The end of the end portion 32a of the protruding portion 32 of the first fiber sheet 30 and the end 40a, in the axial direction, of the second fiber sheet 40 engage with each other in the axial direction A of the container body 10, and oppose each other in the axial direction A without a gap, as shown in FIG. 6. Hereinafter, the position at which the end of the end portion 32a of the protruding portion 32 of the first fiber sheet 30 and the end 40a, in the axial direction, of the second fiber sheet 40 engage with each other is referred to as engagement position C. The engagement positions C are located on both sides in the axial direction so as to sandwich the second fiber sheet 40, and oppose the tubular barrel portion 10a in the radial direction.

The two sheets, that is, one long length sheet that is the first fiber sheet 30 forming the small angle helical layer, and one long length sheet that is the second fiber sheet 40 forming the hoop layer are stacked and simultaneously wound around the circumference on the container body 10 a predetermined plural number of times, thereby forming the fiber-reinforced member 20. The fiber-reinforced member 20 is formed such that the sheet body portion 31 of the first fiber sheet 30, and the second fiber sheet 40 are alternately layered in the radial direction so as to form a plurality of layers.

In order to form the fiber-reinforced member 20, the protruding portions 32 of the first fiber sheet 30 are adhered to the dome portions 10b (the end portions 32a are adhered to the tubular barrel portion 10a) when portions, of the sheet body portion 31, corresponding to and continuous with the protruding portions 32 are in contact with and adhered to the tubular barrel portion 10a of the container body 10. The protruding portions 32 may be adhered by using, for example, a tool such as a roller such that the protruding portion 32 is pressed from the sheet boundary 33 side between each protruding portion 32 and the sheet body portion 31 toward the end of the end portion 32a along the outer surface of the dome portion 10b. The protruding portions 32 adjacent to each other in the circumferential direction are adhered sequentially each time the corresponding portion of the sheet body portion 31 is adhered to the tubular barrel portion 10a.

The pressure-resistant container 1 is produced in the following procedure. Specifically, the two sheets, that is, one long length sheet that is the first fiber sheet 30 of the fiber-reinforced member 20 and one long length sheet that is the second fiber sheet 40 of the fiber-reinforced member 20 are firstly stacked over each other. The two long length sheets may be stacked such that the winding start end portions, in the circumferential direction, of the two long length sheets are displaced in the circumferential direction of the tubular barrel portion 10a. Specifically, the displacement may be such that, when the protruding portion 32 with which the first fiber sheet 30 is started to be wound is adhered to the outer surface of the dome portion 10b, and the end portion 32a of the protruding portion 32 is adhered to the tubular barrel portion 10a, engagement of the end of the end portion 32a and the end 40a, in the axial direction, of the second fiber sheet 40, in the axial direction A, is started. The two long length sheets are disposed at an ordinary temperature such that the fluidity of the resin component with which the sheet is impregnated becomes high when the two long length sheets are stacked as described above.

Next, while the two long length sheets stacked as described above and the container body 10 are rotated relative to each other about the axis that extends in the axial direction A, the two long length sheets are spirally wound on the outer surface of the container body 10 in a state where the two long length sheets are stacked. In this case, the sheet body portion 31 of the first fiber sheet 30, and the second fiber sheet 40 are layered over the tubular barrel portion 10a of the container body 10 and simultaneously adhered to the tubular barrel portion 10a of the container body 10. Each protruding portion 32 of the first fiber sheet 30 is adhered to the dome portion 10b (the end portion 32a is adhered to the tubular barrel portion 10a) when (specifically, immediately after) the portion, of the sheet body portion 31, corresponding to and continuous with the protruding portion 32 is adhered to the tubular barrel portion 10a. Furthermore, the second fiber sheet 40 is adhered to the tubular barrel portion 10a so as to engage, in the axial direction A, with the end of the end portion 32a of the protruding portion 32 of the first fiber sheet 30 adhered to the tubular barrel portion 10a, as described above.

When winding and adhesion of the two long length sheets onto the container body 10 have been completed, the fiber-reinforced member 20 is heated to solidify the resin component. When the resin component of the fiber-reinforced member 20 has been solidified, the fiber-reinforced member 20 is fixedly adhered to the outer surface of the container body 10.

Thus, in a state where different kinds of sheet members (specifically, the sheet body portion 31 of the first fiber sheet 30 that forms the small angle helical layer, and the second fiber sheet 40 that forms the hoop layer) are stacked as the fiber-reinforced member 20, the sheet members are spirally wound on the outer surface of the tubular barrel portion 10a of the container body 10, and the protruding portions 32 of the first fiber sheet 30 are wound back around the dome portions 10b, whereby the fiber-reinforced member 20 is wound and tightened onto the outer surface of the container body 10, so that the pressure-resistant container 1 is produced.

In the pressure-resistant container 1, the tubular barrel portion 10a of the container body 10 is covered by mainly the sheet body portion 31 of the first fiber sheet 30 and the second fiber sheet 40 being layered in the radial direction. The dome portions 10b of the container body 10 are covered by a plurality of the protruding portions 32 of the first fiber sheet 30 being woven into each other. In this state, the small angle helical layer is formed from the first fiber sheet 30, and the hoop layer is formed from the second fiber sheet 40. Therefore, in the pressure-resistant container 1, a high strength is assured so as to suppress, by the hoop layer, radially outward expansion of mainly the tubular barrel portion 10a of the container body 10. Simultaneously, in the pressure-resistant container 1, a high strength is assured so as to suppress, by the small angle helical layer, outward expansion of the dome portions 10b of the container body 10. Therefore, in the pressure-resistant container 1, pressure resistance is sufficiently assured and the strength is enhanced.

Furthermore, in the pressure-resistant container 1, the small angle helical layer is formed from the first fiber sheet 30 so as to be wound and tighten onto the dome portions 10b of the container body 10. The first fiber sheet 30 has the sheet body portion 31 formed in a sheet-like shape by a plurality of fibers oriented in one direction being aligned in parallel with each other. When the first fiber sheet 30 is wound on the container body 10 once around the axis, the small angle helical layer corresponding to one layer is formed. In this case, the tubular barrel portion 10a of the container body 10 is covered by the sheet body portion 31, of the first fiber sheet 30, formed in the sheet-like shape. In such a structure, in order to form the small angle helical layer corresponding to one layer on the tubular barrel portion 10a, one sheet body portion 31 is wound merely once on the tubular barrel portion 10a.

For example, in a structure (comparative structure) in which one fiber is wound on the container body 10 by a filament winding method or the like, the one fiber needs to be wound on the container body 10 multiple times while the position at which the one fiber is disposed is shifted in the axial direction A in order to form the small angle helical layer corresponding to one layer on the tubular barrel portion 10a of the container body 10. In the comparative structure, while the fiber is being wound, fibers, adjacent to each other, extending at a small angle relative to the axial direction A of the tubular barrel portion 10a are not fixed or fixedly adhered to each other. Therefore, the fibers are likely to be displaced with respect to the container body 10, and a production time required for forming the small angle helical layer on the tubular barrel portion 10a is extremely increased.

Meanwhile, in the pressure-resistant container 1 according to the present embodiment, the sheet body portion 31 formed in a sheet-like shape is used in order to form the small angle helical layer on the tubular barrel portion 10a. Therefore, as compared to the comparative structure, a production time required for forming the small angle helical layer on the tubular barrel portion 10a is greatly shortened. Furthermore, even while the sheet body portion 31 is being wound on the tubular barrel portion 10a, since the fibers, adjacent to each other, for forming the small angle helical layer on the tubular barrel portion 10a are fixed or fixedly adhered to each other, displacement of the fibers that form the small angle helical layer is suppressed.

Moreover, in the pressure-resistant container 1, the first fiber sheet 30 includes a plurality of the protruding portions 32, and the plurality of the protruding portions 32 are aligned on and protrude from both end portions, in the fiber direction D1, of the sheet body portion 31, and are wound back around the dome portions 10b on both the sides in the axial direction. When the plurality of the protruding portions 32 corresponding to one layer of the small angle helical layer are each wound back along the outer surfaces of the dome portions 10b, the entirety of the dome portions 10b is covered by the protruding portions 32. That is, the plurality of the protruding portions 32 that are aligned on and protrude from both end portions, in the fiber direction D1, of the sheet body portion 31 are used in order to form the small angle helical layer that covers the dome portions 10b. Therefore, as compared to the comparative structure, the plurality of the protruding portions 32 that cover the dome portions 10b are integrated with the sheet body portion 31, and separation of the protruding portions 32 is inhibited, so that the protruding portions 32 are easily wound on the dome portions 10b, and a time required for forming the small angle helical layer on the dome portions 10b is shortened.

Therefore, in the pressure-resistant container 1, a time required for winding the fiber-reinforced member 20 (specifically, the first fiber sheet 30) on both the tubular barrel portion 10a and the dome portions 10b of the container body 10 is shortened.

Furthermore, in the pressure-resistant container 1, the sheet body portion 31 that is formed in a sheet-like shape and is wound on the tubular barrel portion 10a, and the protruding portions 32 that are wound on the dome portions 10b are integrated with each other, and the sheet body portion 31 and the protruding portions 32 are formed from the same sheet member. Therefore, the small angle helical layer formed on the dome portions 10b and the small angle helical layer formed on the tubular barrel portion 10a are formed by using the integrated common sheet member.

Moreover, in the pressure-resistant container 1, the hoop layer that is wound and tightened onto the tubular barrel portion 10a of the container body 10 is formed from the second fiber sheet 40. The second fiber sheet 40 is formed in a sheet-like shape by a plurality of fibers oriented in one direction being aligned in parallel with each other. The second fiber sheet 40 is stacked over the first fiber sheet 30 before being wound on the outer surface of the tubular barrel portion 10a, and is spirally wound on the outer surface of the tubular barrel portion 10a in a state where the second fiber sheet 40 is stacked over the first fiber sheet 30. In such a structure, the hoop layer is formed from the second fiber sheet 40 simultaneously when the small angle helical layer is formed from the first fiber sheet 30. Furthermore, the second fiber sheet 40 formed in a sheet-like shape is used in order to form the hoop layer on the tubular barrel portion 10a. Therefore, a production time required for forming the hoop layer on the tubular barrel portion 10a is shortened as compared to a case where a filament winding method or the like is used.

Moreover, in the pressure-resistant container 1, the tensile strength, in the fiber direction, of the fiber of the first fiber sheet 30 is less than the tensile strength, in the fiber direction, of the fiber of the second fiber sheet 40. In order to enhance the strength of the pressure-resistant container 1, the liner portion 11, of the container body 10, except for portions with which the caps 12 contact, that is, mainly the tubular barrel portion 10a needs to be covered by the fiber-reinforced member 20 having a high strength. In order to cover the tubular barrel portion 10a with a member having a high strength, forming of the hoop layer is important, and enhancement of the tensile strength, in the fiber direction, of the fiber of the second fiber sheet 40 is effective. Meanwhile, the dome portion 10b need not be covered by a member having a high strength as compared to the tubular barrel portion 10a. Therefore, enhancement of the tensile strength, in the fiber direction, of the fiber of the first fiber sheet 30 for forming the small angle helical layer that covers the dome portion 10b is less necessary than enhancement of the tensile strength of the second fiber sheet 40 that covers the tubular barrel portion 10a.

In general, the higher the tensile strength, in a fiber direction, of a fiber is, the more expensive the fiber is. From this viewpoint, when the first fiber sheet 30 and the second fiber sheet 40 are each formed from a material selected so as to have a necessary tensile strength that meets the application, the cost of the fiber-reinforced member 20 is reduced as compared to a case where both the fiber sheets 30, 40 are formed from the same material having a sufficiently high tensile strength for forming the hoop layer. That is, if the first fiber sheet 30 is formed from a material having a minimum tensile strength necessary for forming the small angle helical layer, and the second fiber sheet 40 is formed from a material having a minimum tensile strength necessary for forming the hoop layer, necessary tensile strength is sufficiently obtained. Therefore, for the pressure-resistant container 1, a sheet member for forming the hoop layer and a sheet member for forming the small angle helical layer are made different from each other in the fiber-reinforced member 20, thereby reducing cost.

Moreover, in the pressure-resistant container 1, in a state where the protruding portions 32 of the first fiber sheet 30 cover the dome portions 10b, the end portion 32a of each protruding portion 32 is located closer to the center portion, in the axial direction, of the container body 10 than the sheet boundary 33 between the sheet body portion 31 and the protruding portion 32 is. In this structure, when the first fiber sheet 30 is wound on the container body 10 multiple times around the circumference, the end portions 32a are sandwiched between the tubular barrel portion 10a and the subsequent layers of the sheet body portion 31 after the end portions 32a are adhered to the tubular barrel portion 10a. Therefore, the end portion 32a of the protruding portion 32 of the first fiber sheet 30 that forms the small angle helical layer is pressed by the sheet body portion 31, thereby preventing the end portion 32a from being removed from the container body 10.

Furthermore, in the pressure-resistant container 1, the end portion 32a of the protruding portion 32 of the first fiber sheet 30 is located closer to the center portion, in the axial direction, of the container body 10 than the sheet boundary 33 is, as described above. The length, in the axial direction, of the second fiber sheet 40 is almost equal to a distance over which the ends of the end portions 32a of the protruding portions 32 that cover the dome portions 10b on both sides, respectively, in the axial direction are spaced from each other in the axial direction A, and, in the axial direction A of the container body 10, the end of the end portion 32a of the protruding portion 32 on each of both sides, in the fiber direction D1, of the first fiber sheet 30 engages with the end 40a, in the axial direction, of the second fiber sheet 40. That is, the second fiber sheet 40 is wound on the tubular barrel portion 10a without overlapping the end portion 32a of the first fiber sheet 30 in the radial direction.

In the structure of the pressure-resistant container 1, the ends of both the first and the second fiber sheets 30 and 40 oppose each other in the axial direction A such that the first fiber sheet 30 and the second fiber sheet 40 do not overlap each other in the radial direction, whereby a step portion (specifically, a step portion generated in the radial direction) is prevented from being generated in the boundary portion (specifically, the boundary portion in the axial direction A) between both the first and the second fiber sheets 30 and 40.

If a step portion is generated in the boundary portion between both the first and the second fiber sheets 30 and 40, at least the first fiber sheet 30, among both the first and the second fiber sheets 30 and 40, is deformed, and the first fiber sheet 30 is likely to expand along the fiber direction D1 due to the deformation. Therefore, the small angle helical layer becomes loose in the direction in which the cap 12 is removed. Meanwhile, in the structure of the pressure-resistant container 1, since a step portion is prevented from being generated in the boundary portion between both the first and the second fiber sheets 30 and 40 as described above, the small angle helical layer formed from the first fiber sheet 30 is prevented from becoming loose in the direction in which the cap 12 is removed. Furthermore, when no step portion is generated in the boundary portion between both the first and the second fiber sheets 30 and 40, damage to the first and the second fiber sheets 30 and 40 due to the step portion is inhibited.

Furthermore, in the pressure-resistant container 1, the sheet body portion 31 of the first fiber sheet 30 and the second fiber sheet 40 are layered over the tubular barrel portion 10a of the container body 10 and simultaneously adhered to the tubular barrel portion 10a in a state where the sheet body portion 31 of the first fiber sheet 30 and the second fiber sheet 40 overlap each other. The sheet body portion 31 of the first fiber sheet 30 is adhered to the tubular barrel portion 10a, the protruding portions 32 of the first fiber sheet 30 are adhered to the dome portions 10b, and the end portions 32a of the protruding portions 32 are further adhered to the tubular barrel portion 10a, and, thereafter, the second fiber sheet 40 is adhered to the tubular barrel portion 10a so as to engage with the ends of the end portions 32a in the axial direction A. When such an adhesion is performed over one circumference around the axis of the container body 10, one layer of the small angle helical layer formed from the first fiber sheet 30 is formed, and one layer of the hoop layer formed from the second fiber sheet 40 is formed. When the adhesion is repeatedly performed multiple times around the circumference, a plurality of layers of the small angle helical layer and the hoop layer are formed.

If a production method, in which the small angle helical layer of the first fiber sheet 30 and the hoop layer of the second fiber sheet 40 are separately formed for each layer, is used, specifically, if a production method, in which the sheet body portion 31 and the protruding portions 32 of the first fiber sheet 30 are each adhered to the container body 10 only over one circumference, and the second fiber sheet 40 is thereafter adhered to the tubular barrel portion 10a of the container body 10 only over one circumference, is used, the end of the end portion 32a of the protruding portion 32 of the first fiber sheet 30 and the end, in the fiber direction D1, of the sheet body portion 31 oppose each other in the axial direction A, and a step portion in the radial direction is generated at the sheet boundary 33 between the sheet body portion 31 and the protruding portion 32.

Meanwhile, in the production method for producing the pressure-resistant container 1 as described above, since the small angle helical layer and the hoop layer are simultaneously formed, the end of the end portion 32a of the protruding portion 32 of the first fiber sheet 30 and the end, in the fiber direction D1, of the sheet body portion 31 do not oppose each other in the axial direction A, and no step portion in the radial direction is generated at the sheet boundary 33 between the sheet body portion 31 and the protruding portion 32. Therefore, the small angle helical layer formed from the first fiber sheet 30 is prevented from becoming loose in the direction in which the cap 12 is removed. Furthermore, when no step portion is generated at the sheet boundary 33 in the first fiber sheet 30, damage to the first fiber sheet 30 due to the step portion is reduced.

In the first embodiment, the fiber-reinforced member 20 includes the first fiber sheet 30 that forms the small angle helical layer and the second fiber sheet 40 that forms the hoop layer. However, the fiber-reinforced member 20 may have a fiber member which forms a hoop layer different from the second fiber sheet 40, in addition to the first fiber sheet 30 and the second fiber sheet 40. The fiber member that forms the hoop layer different from the second fiber sheet 40 may be a member formed by one fiber being helically wound multiple times around the axis on the outer surface of the container body 10, instead of a sheet member that is formed into a sheet-like shape in advance before the sheet member is wound on the outer surface of the container body 10. The fiber member may be formed by one fiber being wound multiple times around the axis on the outer surface (specifically, the outer surface of the first fiber sheet 30 or the second fiber sheet 40) of the tubular barrel portion 10a of the container body 10 while the one fiber is being displaced in the axial direction A in a state where the first fiber sheet 30 and the second fiber sheet 40 cover the outer surface of the container body 10. The fiber member that forms a hoop layer different from the second fiber sheet 40 is a member to be disposed on the radially outermost side (outermost side portion) outward of the first fiber sheet 30 and the second fiber sheet 40.

Moreover, in the first embodiment, the fiber-reinforced member 20 has such a structure that the end of the end portion 32a of the protruding portion 32 of the first fiber sheet 30 and the end 40a, in the axial direction, of the second fiber sheet 40 oppose and engage with each other in the axial direction A of the container body 10 without a gap. However, the present invention is not limited to such a structure. The fiber-reinforced member 20 may have such a structure that the end portion 32a of the protruding portion 32 of the first fiber sheet 30 and the end portion, in the axial direction, of the second fiber sheet 40 overlap each other and are stacked in the radial direction.

Second Embodiment

A pressure-resistant container 2 according to a second embodiment is described with reference to FIG. 7 and FIG.

8. The pressure-resistant container 2 is a tank as described for the pressure-resistant container 1 in the first embodiment, and is mounted to an automobile and the like. The pressure-resistant container 2 includes the container body 10 and a fiber-reinforced member 100. In FIG. 7 and FIG. 8, the same components as shown in FIG. 2, FIG. 6, and the like in the above description are denoted by the same reference numerals, and the description thereof is omitted or abbreviated.

The fiber-reinforced member 100 is a reinforcing member that has the same function as the fiber-reinforced member 20 described above, forms an outer wall layer of the pressure-resistant container 2, and covers the outer surface of the container body 10. The fiber-reinforced member 100 is formed from a high strength fiber that is impregnated with resin. The fiber-reinforced member 100 is structured such that the small angle helical layer is sandwiched between two hoop layers of different kinds.

Figure 7:
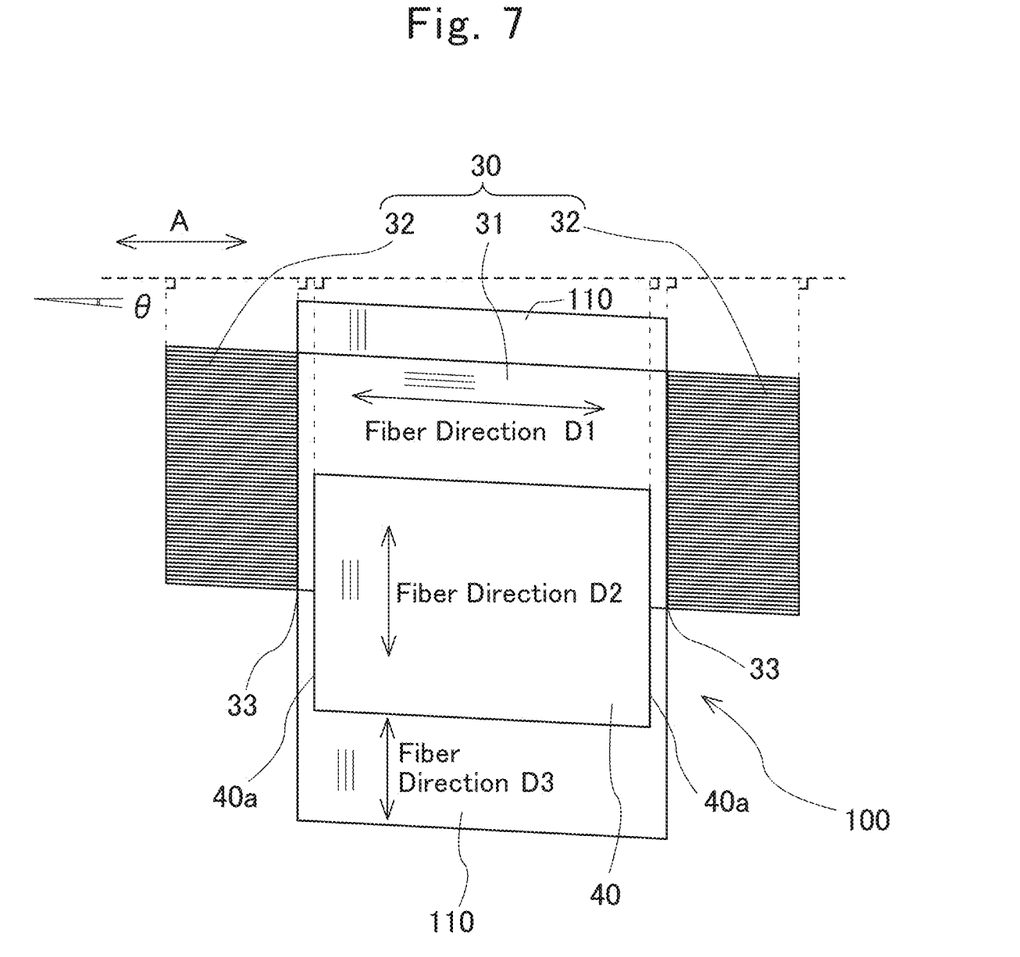
FIG. 7 is a plan view of a fiber-reinforced member of a pressure-resistant container according to a second embodiment of the present invention.
Figure 8:
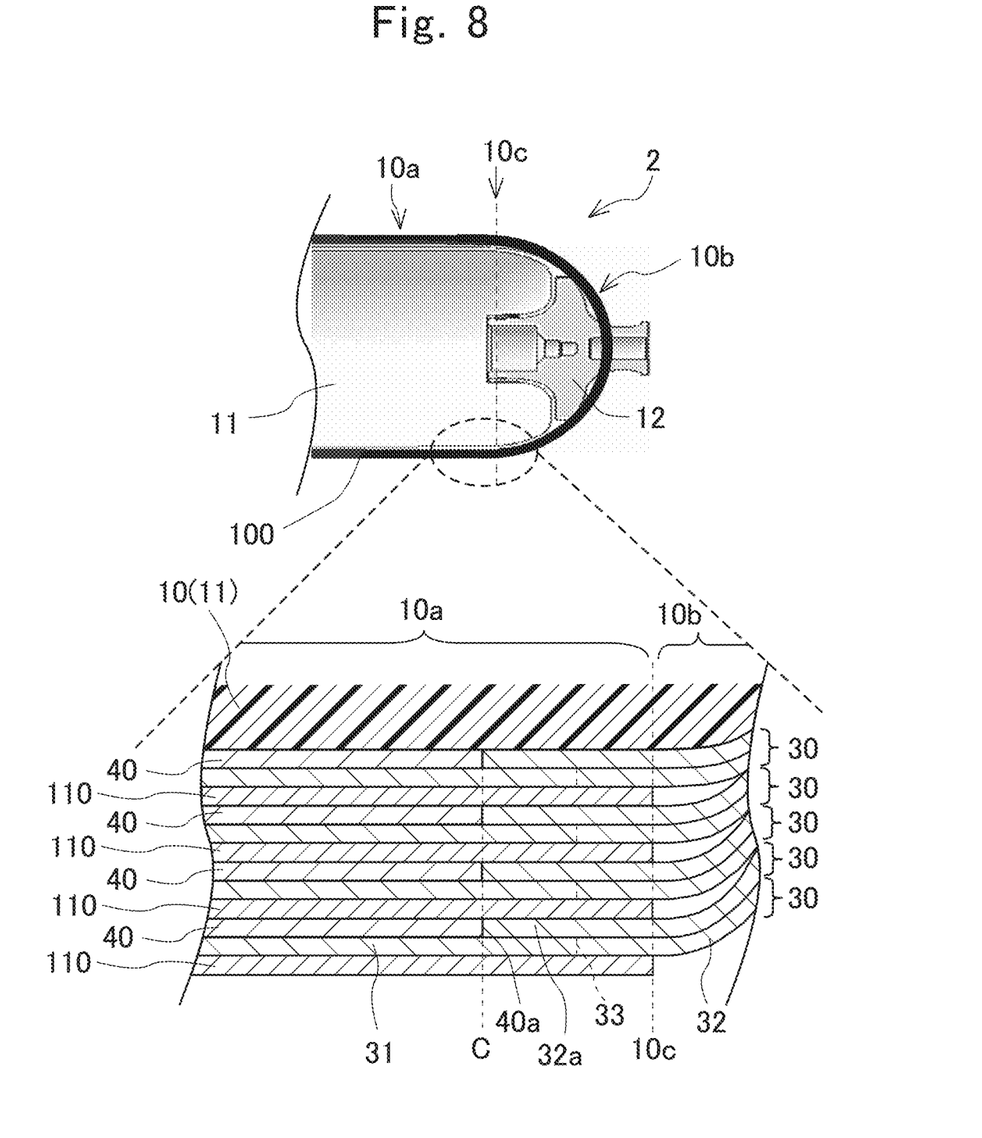
FIG. 8 illustrates an enlarged cross-section of a main portion of the pressure-resistant container according to the second embodiment.

The fiber-reinforced member 100 includes the first fiber sheet 30, the second fiber sheet 40, and a third fiber sheet 110 as shown in FIG. 7. The first fiber sheet 30, the second fiber sheet 40, and the third fiber sheet 110 are each formed from fibers oriented in one direction. The third fiber sheet 110 is a member different from the first fiber sheet 30 and the second fiber sheet 40, and is a member that forms a hoop layer different from the hoop layer formed from the second fiber sheet 40. The tensile strength, in the fiber direction, of the fiber of the third fiber sheet 110 is almost equal to the tensile strength, in the fiber direction, of the fiber of the second fiber sheet 40, and is higher than the tensile strength, in the fiber direction, of the fiber of the first fiber sheet 30.

The third fiber sheet 110 is a sheet member formed in a sheet-like shape. The third fiber sheet 110 is structured such that a plurality of fibers oriented in one direction are aligned in parallel with each other. The third fiber sheet 110 is formed into the sheet-like shape in advance before the third fiber sheet 110 is wound on the outer surface of the container body 10. The third fiber sheet 110 is wound into a tubular shape (specifically, cylindrical shape) on the outer surface of the tubular barrel portion 10a of the container body 10, thereby covering the tubular barrel portion 10a. The length, in the axial direction, of the third fiber sheet 110 is almost equal to the length, in the axial direction, of the tubular barrel portion 10a of the container body 10. The length, in the axial direction, of the third fiber sheet 110 is greater than the length, in the axial direction, of the second fiber sheet 40.

The third fiber sheet 110 is formed and disposed such that the fiber direction of the third fiber sheet 110 is a direction D3 (that is, circumferential direction) that is orthogonal to the axial direction A of the container body 10 when the third fiber sheet 110 covers the tubular barrel portion 10a. That is, the third fiber sheet 110 covers the tubular barrel portion 10a in a state where the fiber extends in the circumferential direction of the tubular barrel portion 10a. The third fiber sheet 110 is layered in the radial direction over the sheet body portion 31 of the first fiber sheet 30, and the second fiber sheet 40, as shown in FIG. 8.

The sheet body portion 31 of the first fiber sheet 30, the second fiber sheet 40, and the third fiber sheet 110 are layered in the radial direction on the outer surface of the tubular barrel portion 10a. The second fiber sheet 40, the sheet body portion 31 of the first fiber sheet 30, the third fiber sheet 110, and the second fiber sheet 40 are layered in order, respectively, such that the sheet body portion 31 of the first fiber sheet 30 is sandwiched between the second fiber sheet 40 and the third fiber sheet 110 in the radial direction. The third fiber sheet 110 is formed and disposed so as to overlap the end portion 32a of the protruding portion 32 of the first fiber sheet 30 in the radial direction, and to cover the engagement position C at which the end of the end portion 32a of the protruding portion 32 of the first fiber sheet 30, and the end 40a, in the axial direction, of the second fiber sheet 40 engage with each other.

The three sheets, that is, one long length sheet that is the first fiber sheet 30 forming the small angle helical layer, one long length sheet that is the second fiber sheet 40 forming the hoop layer, and one long length sheet that is the third fiber sheet 110 similarly forming the hoop layer are stacked, and simultaneously wound around the circumference on the container body 10 a predetermined plural number of times, thereby forming the fiber-reinforced member 100. The fiber-reinforced member 100 is formed such that the sheet body portion 31 of the first fiber sheet 30, the second fiber sheet 40, and the third fiber sheet 110 are layered in the radial direction so as to form a plurality of layers.

While the three long length sheets having been stacked, and the container body 10 are rotated relative to each other around the axis that extends in the axial direction A, the three long length sheets are spirally wound on the outer surface of the container body 10 in a state where the three long length sheets are stacked, thereby producing the pressure-resistant container 2. In this case, the sheet body portion 31 of the first fiber sheet 30, the second fiber sheet 40, and the third fiber sheet 110 are stacked on the tubular barrel portion 10a of the container body 10 and simultaneously adhered to the tubular barrel portion 10a of the container body 10. When winding and adhesion of the three long length sheets onto the container body 10 have been completed, the fiber-reinforced member 100 is heated to solidify the resin component. When the resin component of the fiber-reinforced member 100 has been solidified, the fiber-reinforced member 100 is fixedly adhered to the outer surface of the container body 10.

Also for the pressure-resistant container 2, the same effect as for the pressure-resistant container 1 of the first embodiment described above is obtained. Furthermore, the following effect is also obtained. Specifically, since the hoop layers are separately formed by both the second fiber sheet 40 and the third fiber sheet 110, respectively, the strength of the hoop layer is enhanced as compared to a structure in which the hoop layer is formed only from the second fiber sheet 40, and pressure resistance of the pressure-resistant container 2 is thus enhanced. Furthermore, the sheet body portion 31 of the first fiber sheet 30 is sandwiched between the second fiber sheet 40 and the third fiber sheet 110 in the radial direction, and, further, the third fiber sheet 110 covers the engagement position C at which the end of the end portion 32a of the protruding portion 32 of the first fiber sheet 30 and the end 40a, in the axial direction, of the second fiber sheet 40 engage with each other, thereby enhancing a function of inhibiting the small angle helical layer formed from the first fiber sheet 30 from becoming loose.

In the second embodiment, the third fiber sheet 110 formed in a sheet-like shape is used as a member for forming a hoop layer different from the hoop layer formed from the second fiber sheet 40. However, the present invention is not limited thereto. As the member for forming the hoop layer, a fiber member formed by one fiber being helically wound around the axis on the outer surface of the container body 10 multiple times may be used instead of the third fiber sheet 110 formed into a sheet-like shape in advance before the third fiber sheet 110 is wound on the outer surface of the container body 10. The fiber member may be formed such that, in a state where each of the first fiber sheet 30 and the second fiber sheet 40 covers the outer surface of the container body 10, one fiber is wound around the axis on the outer surface (specifically, the outer surface of the first fiber sheet 30 or the second fiber sheet 40) of the tubular barrel portion 10a of the container body 10 multiple times while the one fiber is being displaced in the axial direction A. The fiber member is a member to be disposed on the radially outermost side (outermost side portion) outward of the first fiber sheet 30 and the second fiber sheet 40.

Third Embodiment

Figure 9:
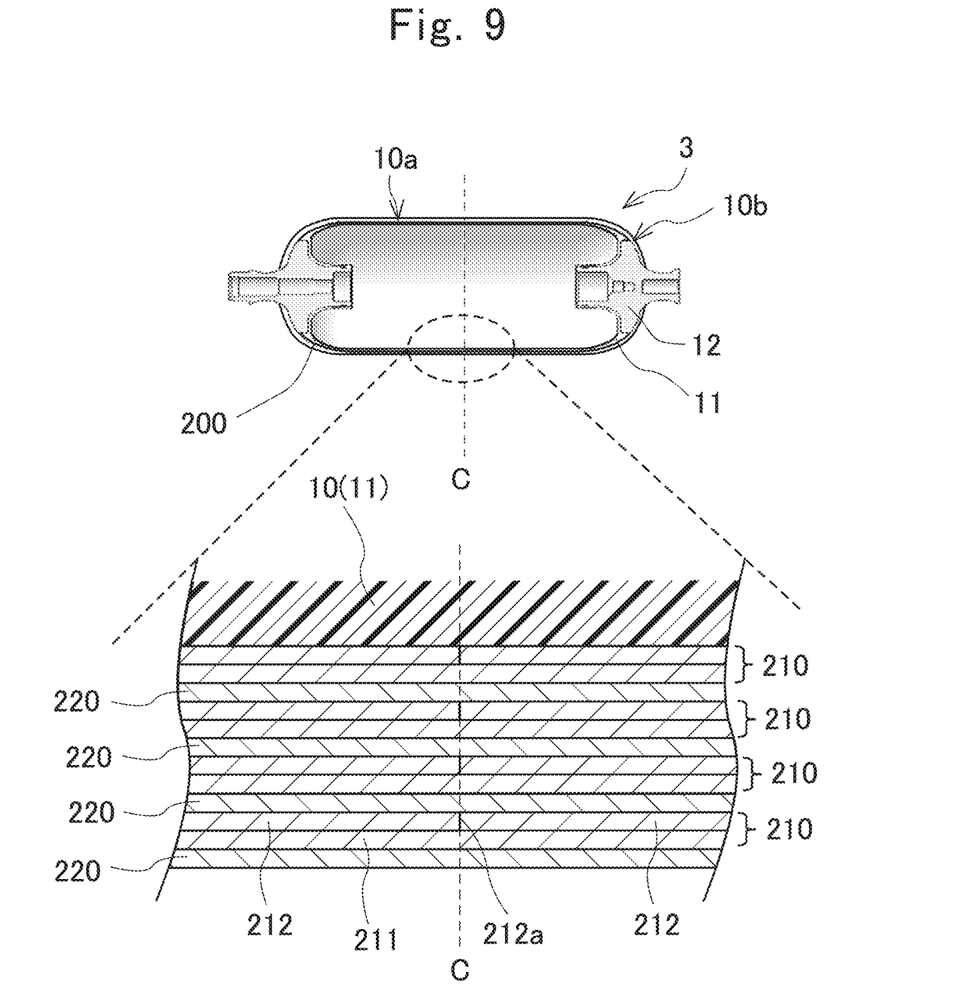
FIG. 9 illustrates an enlarged cross-section of a main portion of a pressure-resistant container according to a third embodiment of the present invention.

A pressure-resistant container 3 according to a third embodiment is described with reference to FIG. 9. The pressure-resistant container 3 is a tank as described for the pressure-resistant containers 1 and 2, and is mounted to an automobile and the like. The pressure-resistant container 3 includes the container body 10 and a fiber-reinforced member 200. In FIG. 9, the same components as shown in FIG. 2, FIG. 6, and the like in the above description are denoted by the same reference numerals, and the description thereof is omitted or abbreviated.

The fiber-reinforced member 200 is a reinforcing member that has the same function as the fiber-reinforced member 20 described above, forms an outer wall layer of the pressure-resistant container 3, and covers the outer surface of the container body 10. The fiber-reinforced member 200 is formed from a high strength fiber which is impregnated with resin.

The fiber-reinforced member 200 includes a first fiber sheet 210 and a second fiber sheet 220 as shown in FIG. 9. The first fiber sheet 210 and the second fiber sheet 220 are each formed from fibers oriented in one direction. The first fiber sheet 210 is a sheet member that forms the small angle helical layer as described above. The second fiber sheet 220 is a sheet member that forms the hoop layer as described above. The tensile strength, in the fiber direction, of the first fiber sheet 210 is less than the tensile strength, in the fiber direction, of the second fiber sheet 220.

The first fiber sheet 210 includes a sheet body portion 211 and protruding portions 212. The sheet body portion 211 is the same as the sheet body portion 31 described above, and has the same shape and size as the sheet body portion 31. The protruding portion 212 is the same as the protruding portion 32 except that the protruding portion 212 has a length, in the protruding direction, different from the length, in the protruding direction, of the protruding portion 32 described above. The length, in the protruding direction, of the protruding portion 212 is about a length from a portion near the container boundary 10c of the container body 10, through a surface including a portion near the apex (that is, end portion of the boss portion 12a of the cap 12) of the dome portion 10b, and further through the container boundary 10c on the radially opposite side, up to the center, in the axial direction, of the tubular barrel portion 10a. Each protruding portion 212 is wound back from the sheet body portion 211 side along the outer surface of the dome portion 10b, thereby covering the dome portion 10b, and covering half the tubular barrel portion 10a in the axial direction.

Ends 212a of the protruding portions 212 at both end portions, in the fiber direction, of the sheet body portion 211 of the first fiber sheet 210 engage with each other in the axial direction A of the container body 10, and oppose each other in the axial direction A without a gap. The engagement position C is located at the center portion, in the axial direction, of the tubular barrel portion 10a, and opposes the tubular barrel portion 10a in the radial direction.

The second fiber sheet 220 is a sheet member formed in a sheet-like shape. The second fiber sheet 220 is structured such that a plurality of fibers oriented in one direction are aligned in parallel with each other. The second fiber sheet 220 is formed into the sheet-like shape in advance before the second fiber sheet 220 is wound on the outer surface of the container body 10. The second fiber sheet 220 is wound into a tubular shape (specifically, cylindrical shape) on the outer surface of the tubular barrel portion 10a of the container body 10, thereby covering the tubular barrel portion 10a. The length, in the axial direction, of the second fiber sheet 220 is almost equal to the length, in the axial direction, of the tubular barrel portion 10a of the container body 10.

The second fiber sheet 220 is formed and disposed such that the fiber direction of the second fiber sheet 220 is a direction (that is, circumferential direction) that is orthogonal to the axial direction A of the container body 10 when the second fiber sheet 220 covers the tubular barrel portion 10a. That is, the second fiber sheet 220 covers the tubular barrel portion 10a in a state where the fiber extends in the circumferential direction of the tubular barrel portion 10a. The second fiber sheet 220 is layered, in the radial direction, over a portion, opposing the tubular barrel portion 10a in the radial direction, of the sheet body portion 211 and protruding portion 212 of the first fiber sheet 210. The first fiber sheet 210 and the second fiber sheet 220 are alternately layered in the radial direction.

The two sheets, that is, one long length sheet that is the first fiber sheet 210 forming the small angle helical layer and one long length sheet that is the second fiber sheet 220 forming the hoop layer are stacked and simultaneously wound around the circumference on the container body 10 a predetermined plural number of times, thereby forming the fiber-reinforced member 200. The fiber-reinforced member 200 is formed such that the first fiber sheet 210 and the second fiber sheet 220 are alternately layered in the radial direction so as to form a plurality of layers.

While the two long length sheets having been stacked, and the container body 10 are rotated relative to each other around the axis that extends in the axial direction A, the two long length sheets are spirally wound on the outer surface of the container body 10 in a state where the two long length sheets are stacked, thereby producing the pressure-resistant container 3. In this case, the first fiber sheet 210 and the second fiber sheet 220 are stacked on the tubular barrel portion 10a of the container body 10 and simultaneously adhered to the tubular barrel portion 10a of the container body 10. When winding and adhesion of the two long length sheets onto the container body 10 have been completed, the fiber-reinforced member 200 is heated to solidify the resin component. When the resin component of the fiber-reinforced member 200 has been solidified, the fiber-reinforced member 200 is fixedly adhered to the outer surface of the container body 10.

Also for the pressure-resistant container 3, the same effects as for the pressure-resistant containers 1 and 2 described above are obtained. Furthermore, the second fiber sheet 220 covers the engagement position C at the center portion, in the axial direction, of the tubular barrel portion 10a, and presses radially inward the end portions of the protruding portions 212 on both sides, in the fiber direction, of the first fiber sheet 210, thereby preventing the end portion 32a from being removed from the container body 10, and inhibiting the small angle helical layer formed from the first fiber sheet 30 from becoming loose.

Figure 10:
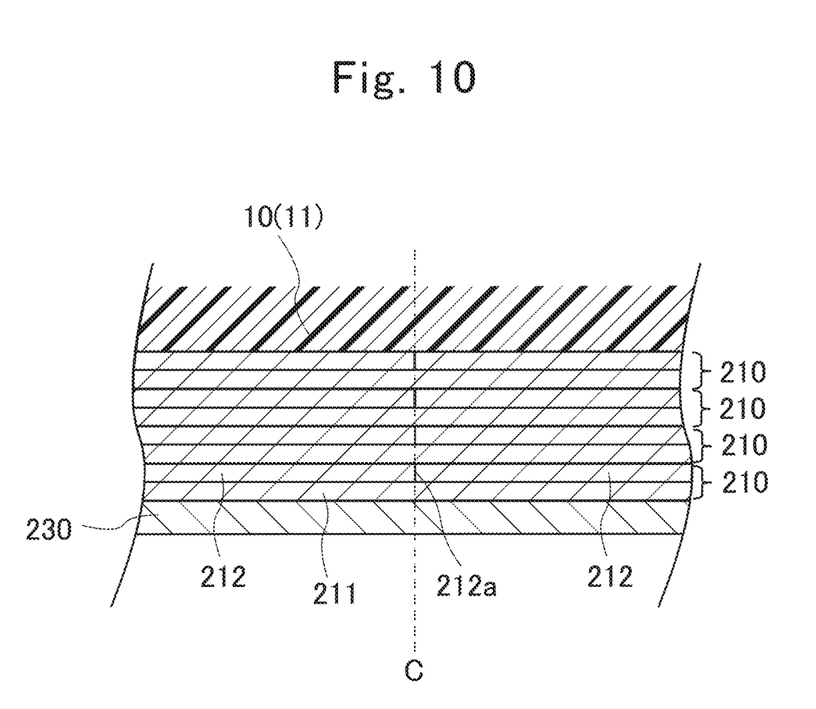
FIG. 10 illustrates an enlarged cross-section of a main portion of a pressure-resistant container according to one modification of the third embodiment.

In the third embodiment, the second fiber sheet 220 formed in a sheet-like shape is used as the member for forming the hoop layer. However, the present invention is not limited thereto. For example, as shown in FIG. 10, a fiber member 230 formed by one fiber being helically wound around the axis on the outer surface of the container body 10 multiple times may be used as the member for forming the hoop layer instead of the second fiber sheet 220 formed into the sheet-like shape in advance before the second fiber sheet 220 is wound on the outer surface of the container body 10. The fiber member 230 may be formed such that, in a state where the first fiber sheet 210 covers the outer surface of the container body 10, one fiber is wound around the axis on the outer surface (specifically, outer surface of the sheet body portion 211 of the first fiber sheet 210) of the tubular barrel portion 10a of the container body 10 multiple times while the one fiber is being displaced in the axial direction A. The fiber member 230 is a member to be disposed on the radially outermost side (outermost side portion) outward of the first fiber sheet 210.

The present invention is not limited to the embodiments and modifications described above, and various changes may be made without departing from the gist of the present invention.

The invention claimed is:

1. A pressure-resistant container comprising:
a container body having a tubular barrel portion and dome portions, the tubular barrel portion extending in an axial direction of the container body, and the dome portions being provided integrally on both end portions of the tubular barrel portion; and
a fiber-reinforced member covering an outer surface of the container body and including a first fiber sheet and a second fiber sheet,
wherein
the first fiber sheet is formed all oriented in a first fiber direction which is tilted at an angle relative to the axial direction of the container body so that the first fiber sheet covers both the dome portions of the tubular body and forms end portions in the axial direction of the container body,
the second fiber sheet is formed from fibers all oriented in a second fiber direction which is a circumferential direction of the tubular barrel portion, the second fiber direction being different from the first fiber direction,
the first fiber sheet includes a sheet body portion formed in a sheet-like shape and a plurality of protruding portions, the protruding portions are aligned on and integral with the sheet body portion and protrude from both end portions of the sheet body portion in the first fiber direction of the first fiber sheet,
the sheet body portion of the first fiber sheet is wound into a tubular shape along an outer surface of the tubular barrel portion of the container to cover the tubular barrel portion, and the protruding portions of the first fiber sheet are wound back along outer surfaces of the dome portions of the container to cover the dome portions,
the second fiber sheet is layered over the sheet body portion of the first fiber sheet in a radial direction of the tubular barrel portion of the container and covers the tubular barrel portion of the container;
a plurality of the protruding portions in the first fiber sheet are layered outward while being displaced such that the protruding portions cover the dome portions, and the plurality of protruding portions of the first fiber sheet are layered in a radial direction while being displaced in a circumferential direction, when the first fiber sheet covers the container body.

2. The pressure-resistant container according to claim 1, wherein an end of each protruding portion of the first fiber sheet and an axially end of the second fiber sheet engage with each other in the axial direction of the container body.

3. The pressure-resistant container according to claim 1, wherein
the fiber-reinforced member includes a third fiber member that is formed from fibers oriented in a third fiber direction which is the circumferential direction of the tubular barrel portion of the container and which is different from the second fiber direction of the fibers of the second fiber sheet, and
the third fiber member is layered over the sheet body portion of the first fiber sheet in the radial direction with the first fiber sheet being sandwiched between the third fiber member and the second fiber sheet and covering the tubular barrel portion of the container.

4. The pressure-resistant container according to claim 1, wherein
each protruding portion of the first fiber sheet includes
a first protruding portion provided on one side in the fiber direction of the sheet body portion, and
a second protruding portion provided on the other side in the fiber direction of the sheet body portion, and
an end of the first protruding portion and an end of the second protruding portion engage with each other in the axial direction of the container body.

5. The pressure-resistant container according to claim 4, wherein
the fiber-reinforced member has a second fiber member that is formed from fibers oriented in one direction, and a fiber direction in which all fibers of the second fiber member is a circumferential direction of the tubular barrel portion and which is different from the first fiber sheet, and
the second fiber member is layered over the first fiber sheet in a radial direction to cover the tubular barrel portion.

6. The pressure-resistant container according to claim 5, wherein
the second fiber member is formed in a sheet-like shape, and
the first fiber sheet and the second fiber member are alternately layered in the radial direction.

7. The pressure-resistant container according to claim 1, wherein the second fiber member is formed by the fibers being wound on an outer surface of the sheet body portion of the first fiber sheet in a state where the first fiber sheet covers the outer surface of the container body.

8. The pressure-resistant container according to claim 1, wherein each protruding portion of the first fiber sheet is formed such that an end portion of the protruding portion is located closer to a center in the axial direction of the container body than a boundary between the protruding portion and the sheet body portion is and in a state where the protruding portions cover the dome portions.

9. The pressure-resistant container according to claim 8, wherein the boundary is positioned so as to oppose the tubular barrel portion in the radial direction.

* * * * *